US006007651A

United States Patent [19]
Ishino

[11] Patent Number: 6,007,651
[45] **Date of Patent: *Dec. 28, 1999**

[54] METHOD OF MANUFACTURING INSULATORS

[75] Inventor: Shigeo Ishino, Niwa-Gun, Japan

[73] Assignee: NGK Insulators, Ltd., Nagoya, Japan

[ * ] Notice: This patent is subject to a terminal disclaimer.

[21] Appl. No.: 09/017,591

[22] Filed: Feb. 3, 1998

Related U.S. Application Data

[63] Continuation of application No. 08/610,521, Mar. 4, 1996, Pat. No. 5,820,722.

[30] Foreign Application Priority Data

Mar. 20, 1995 [JP] Japan .................................... 7-60616
Jan. 17, 1996 [JP] Japan .................................... 8-5988

[51] Int. Cl.[6] .................................... B29C 65/70

[52] U.S. Cl. .................... 156/87; 156/294; 156/303.1; 174/179

[58] Field of Search .................... 156/91, 293, 294, 156/295, 86, 87, 303.1; 264/230, 249; 174/178, 179, 195, 196, 209

[56] References Cited

U.S. PATENT DOCUMENTS 3,134,164 5/1964 Hocks .
4,312,123 1/1982 Wheeler .
4,724,284 2/1988 Wheeler .
5,413,443 5/1995 Aghamehdi .................... 411/383
5,820,722 10/1998 Ishino .................... 156/294

FOREIGN PATENT DOCUMENTS 2511809 9/1976 Germany .
153269 12/1981 Germany .
61-181015 8/1986 Japan .
1116197 6/1968 United Kingdom .
94/29886 12/1994 WIPO .

*Primary Examiner*—Steven D. Maki
*Attorney, Agent, or Firm*—Wall Marjama Bilinski & Burr

[57] ABSTRACT

A method of manufacturing insulators with excellent high-voltage performance having a core member, a sheath arranged on an outer surface of the core member and a shed arranged on an outer surface of the sheath is disclosed. In a first aspect of the invention, a method includes the steps of arranging the sheath made of non-cured polymer materials on an outer surface of the core member, arranging a plurality of the sheds made of cured polymer materials on an outer surface of the sheath, and curing the sheath to connect the sheath to the sheds. In a second aspect of the invention, a method includes the steps of arranging the sheath made of cured polymer materials on an outer surface of the core member, arranging a plurality sheds made of cured polymer materials on an outer surface of the sheath, and connecting the sheath to the sheds by using adhesives. In both aspects, a small diameter portion in which a diameter becomes gradually smaller is arranged on all or a part of an inner circumferential surface of the shed to which the sheath is connected, and a securing force of the shed with respect to the sheath is largest at a minimum diameter portion of the small diameter portion as compared with the other portions.

6 Claims, 5 Drawing Sheets

METHOD OF MANUFACTURING INSULATORS

This is a continuation of application Ser. No. 08/610,521 filed Mar. 4,1996, which is hereby incorporated herein by reference, now U.S. Pat. No. 5,820,722.

BACKGROUND OF THE INVENTION (1) Field of the Invention

The present invention relates to a method of manufacturing insulators having excellent high-voltage performance such as polymer insulators or polymer hollow insulators used in an open-air space, especially relates to a method of manufacturing insulators which prevent a generation of electric defects such as voids at a boundary between a sheath arranged on an outer surface of a core member and a shed arranged on an outer surface of the sheath.

(2) Description of Related Arts

As insulators having an excellent high-voltage performance, polymer insulators using a solid core member and polymer hollow insulators using a hollow core member are known. These insulators have a construction such that an outer surface of the core member is covered with the sheath made of polymer materials and a plurality of sheds made of polymer materials are arranged equidistantly on an outer surface of the sheath.

The shed prevents generation of flashovers on an outer surface of the sheath. The flashover is caused by electric water passage generated on an outer surface of the sheath due to rain,for example. Therefore, the shed and the sheath must be connected tightly so as not to generate defects such as voids therebetween. This is because, if the defects such as voids are generated at the boundary between the sheath and the shed, a dielectric strength of the insulator is decreased due to the electric water passage. Particularly, a dielectric fracture is liable to be generated at an inner portion of the shed. Moreover, corona discharge due to the void causes radio wave interference, and thus voids are not preferred.

It is understood that a reason for void generation at the boundary mentioned above is as follows. When the sheath and the shed are connected by curing, a water component or a gas component included in non-cured polymer materials is closed in the boundary. When they are connected by adhesives, a water component or the like included in the adhesives is closed in the boundary.

Japanese Patent Laid-Open Publication No. 61-181015 discloses a method of connecting the sheath and the shed. In this publication, there is disclosed (1) a method of connecting the sheath made of non-cured polymer materials and the shed made of cured polymer materials by curing the sheath, and (2) a method of connecting the sheath made of cured polymer materials and the shed made of cured polymer materials by using adhesives in such a manner that the shed is adhered to a recess arranged on an outer surface of the sheath.

In the method (1) in which the connection is performed by curing the sheath, since a securing force F at the connecting portion 13' is uniform along an inner surface of the shed 5' as shown in FIG. 6, a rubber flow 12' of the sheath 3? at the connecting portion 13' is moved inwardly. Therefore, a water component or a gas component included in the non-cured polymer materials of the sheath 3', which are moved together with the rubber flow 12', is flowed also inwardly, so that it is closed in the connecting portion 13' or in the sheath 3' close to the connecting portion 13'. As a result, the defects such as voids are generated in the connecting portion 13'. Particularly, since a water component or a gas component included in an outer surface of the sheath 3', to which a center portion 10' of the shed 5' is faced, has a long way for degassing, there is an extremely high possibility such that a water component or a gas component is closed in the connection portion.

On the other hand, in the method (2) in which the connection is performed by using the adhesives, since the securing force at the connecting portion is uniform as is the same as the method (1), a moving direction of the adhesives is not fixed in the case of a connecting operation. Therefore, there is an extremely high possibility such that a water component or the like included in the adhesives is closed in the connecting portion.

In order to eliminate the residual water component or gas component in the connecting portion, the inventors further discussed the methods (1) and (2) mentioned above. As a result, the inventors found it preferable that, in both methods, a flow of a water component or a gas component in the non-cured rubber and a movement of the adhesives are controlled in a predetermined direction by adjusting the securing force of the shed with respect to the sheath.

SUMMARY OF THE INVENTION

An object of the invention is to eliminate the drawbacks mentioned above and to provide a method of manufacturing insulators having excellent high-voltage performance, which prevent generation of voids at a boundary between an inner surface of a shed and an outer surface of a sheath by adjusting a securing force of the shed with respect to the sheath.

According to a first aspect of the invention, a method of manufacturing insulators with excellent high-voltage performance having a core member, a sheath arranged on an outer surface of the core member and a shed arranged on an outer surface of the sheath, comprises the steps of arranging said sheath made of non-cured polymer materials on an outer surface of said core member; arranging a plurality of said sheds made of cured polymer materials on an outer surface of said sheath; and curing said sheath to connect said sheath to said sheds, wherein, prior to said curing, a small diameter portion in which a diameter becomes gradually smaller is arranged on all or a part of an inner circumferential surface of said shed to which said sheath is connected, and a securing force of said shed with respect to said sheath is largest at a minimum diameter portion of said small diameter portion as compared with the other portions.

According to a second aspect of the invention, a method of manufacturing insulators with excellent high-voltage performance having a core member, a sheath arranged on an outer surface of the core member and a shed arranged on an outer surface of the sheath, comprises the steps of arranging said sheath made of cured polymer materials on an outer surface of said core member; arranging a plurality of said sheds made of cured polymer materials on an outer surface of said sheath; and connecting said sheath to said sheds by using adhesives, wherein a small diameter portion in which a diameter becomes gradually smaller is arranged on all or a part of an inner circumferential surface of said shed to which said sheath is connected by using the adhesives, and a securing force of said shed with respect to said sheath is largest at a minimum diameter portion of said small diameter portion as compared with the other portions.

In this invention the insulators include a polymer hollow insulator having a cylindrical core member and also a polymer insulator having a solid core member. Moreover, the cured polymer materials mean polymer materials which finish a cross-linking reaction by a curing step. Further, the non-cured polymer materials mean polymer materials which do not perform the curing step. Furthermore, the center portion of the inner circumferential surface of the shed means a center portion among three portions obtained by dividing the inner circumferential surface into three parts along a width direction.

DESCRIPTION OF THE PREFERRED EMBODIMENTS

Figure 1:
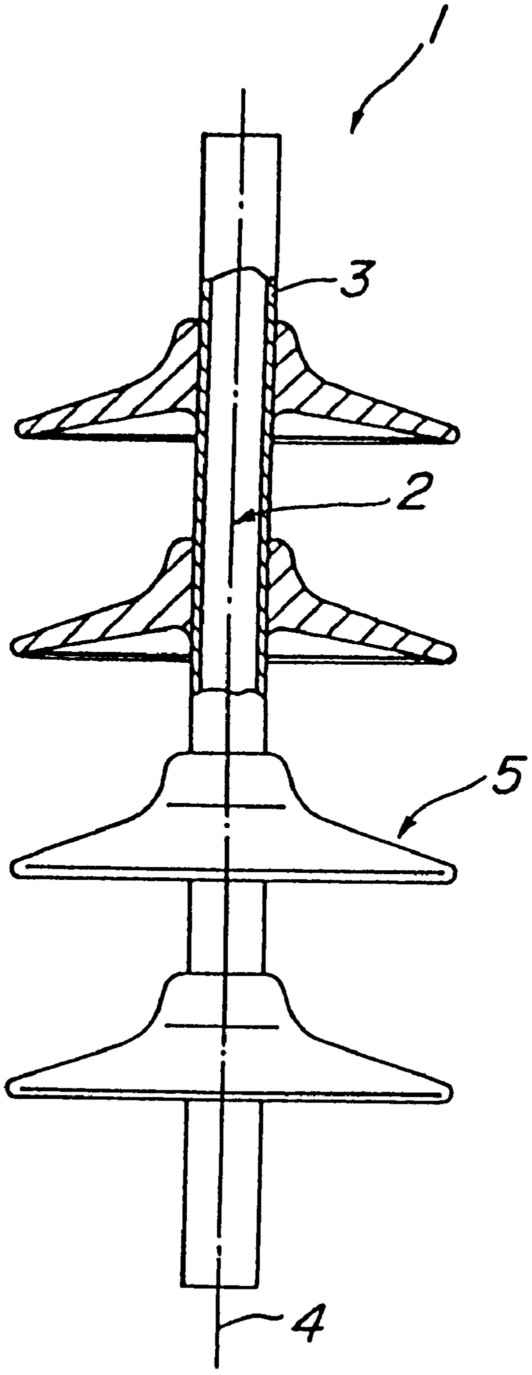
FIG. 1 is a partial cross sectional view showing a main part of a polymer insulator manufactured according to a first aspect and a second aspect of the invention.

FIG. 1 is a partial cross sectional view showing a main part of a polymer insulator according to a first aspect and a second aspect of the invention. In the embodiment shown in FIG. 1, 1 is a polymer insulator, 2 is a core member, 3 is a sheath, 4 is an axial line of the core member 2, and 5 is a shed.

In the case of manufacturing the polymer insulator 1 having the construction shown in FIG. 1 according to the first aspect of the invention, an outer surface of the solid core member 2 made of fiber reinforced plastics, in which fibers such as glass, aramid, nylon and so on are arranged in epoxy resins, polyester resins and so on, is covered with the sheath 3 made of non-cured polymer materials. Then, a plurality of sheds 5 made of cured polymer materials are set equidistantly along the axial line 4 of the core member 2 on an outer surface of the sheath 3 to obtain a composite body. After that, the thus obtained composite body is set in a metal mold and the sheath 3 is cured to connect the sheath 3 to the sheds 5. On the other hand, in the case of manufacturing the polymer insulator 1 according to the second aspect of the invention, an outer surface of the solid core member 2 is covered with the sheath 3 made of cured polymer materials. Then, a plurality of sheds 5 made of cured polymer materials are set equidistantly along the axial line 4 of the core member 2 on an outer surface of the sheath 3. After that, the sheath 3 and the sheds 5 are connected by arranging adhesives therebetween.

The sheath 3 is made of the non-cured polymer materials in the first aspect of the invention or the cured polymer materials in the second aspect of the invention. The sheds are made of the cured polymer materials in both of the first aspect and the second aspect of the invention. In both aspects of the invention, it is preferred to use the polymer materials having an insulation property such as silicone rubber, ethylene propylene rubber, (EPM, EPDM), polyurethane and so on as the sheath 3 and the sheds 5. Moreover, it is preferred to use the same polymer materials as the sheath 3 and the sheds 5.

As a method of covering an outer surface of the core member 2 with the sheath 3, it is preferred to use extrusion in both aspects of the invention. Moreover, as a method of setting a plurality of sheds 5 equidistantly on an outer surface of the sheath 3, it is preferred to use a method in which an inner diameter of a center hole of the shed 5 is extended mechanically and the core member 2 is inserted in the center hole. However, these methods are not limited to the embodiments mentioned above and the other methods can be applied freely.

Figure 2A:
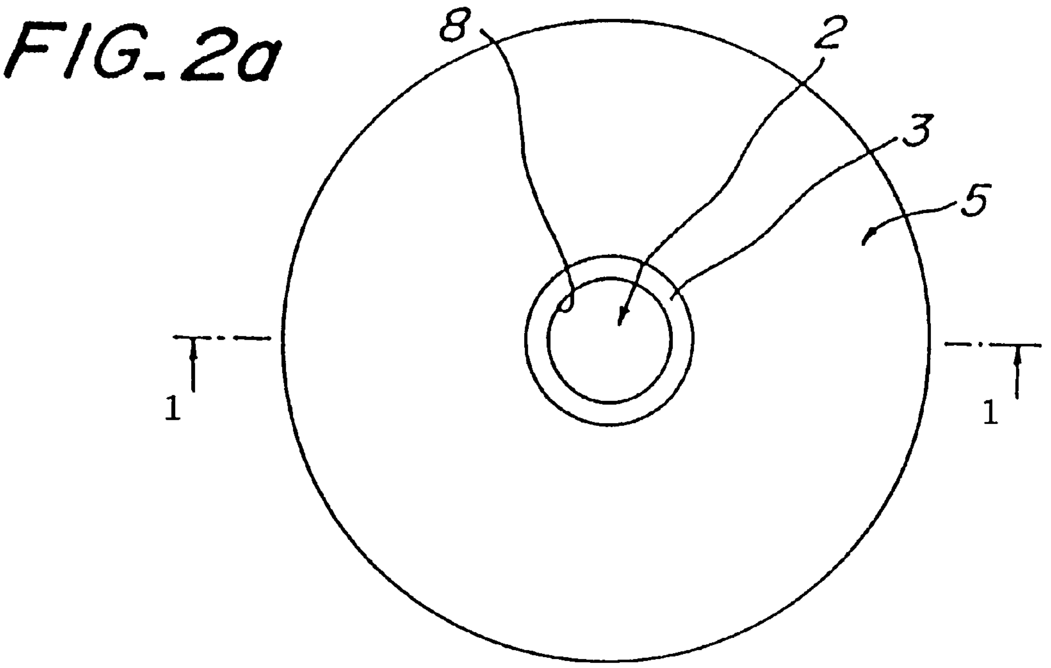
FIG. 2*a* is a front view illustrating one embodiment of the polymer insulator shown in FIG. 1 viewed from an upper position.
Figure 2B:
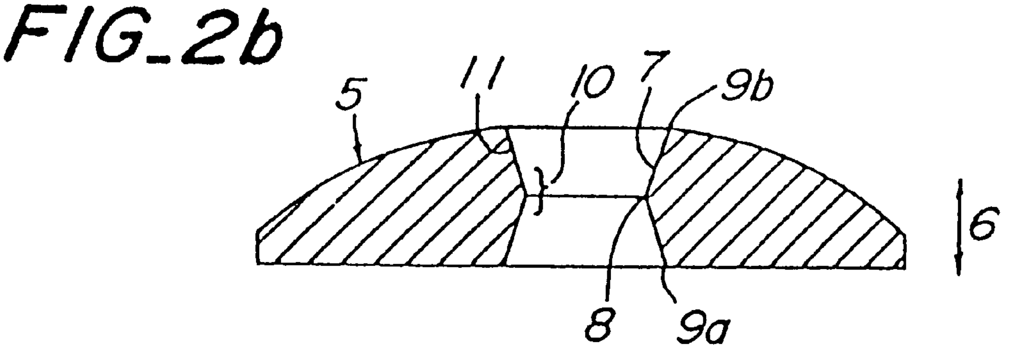
FIG. 2*b* is a cross sectional view depicting one embodiment cut along 1—1 line in FIG. 2*a;*

FIG. 2*a* is a front view showing one embodiment of the polymer insulator 1 shown in FIG. 1 viewed from an upper position, and FIG. 2*b* is a cross sectional view cut along 1—1 line in FIG. 2*a*. In the embodiment shown in FIGS. 2*a* and 2*b*, the shed 5 has a small diameter portion 8 at its inner circumferential surface 7 in which a diameter becomes gradually smaller from both end portions 9*a* and 9*b*. In this embodiment, the small diameter portion 8 is arranged at a center portion 10 of the inner circumferential surface 7. However, in both of the first aspect and the second aspect of the invention, it is sufficient to arrange the small diameter portion 8 on all or a part of the inner circumferential surface 7 of the shed 5 to which the sheath 3 is connected. Therefore, a position and a shape of the small diameter portion 8 is not limited to the embodiment mentioned above, and thus various modifications are possible.

Figure 3:
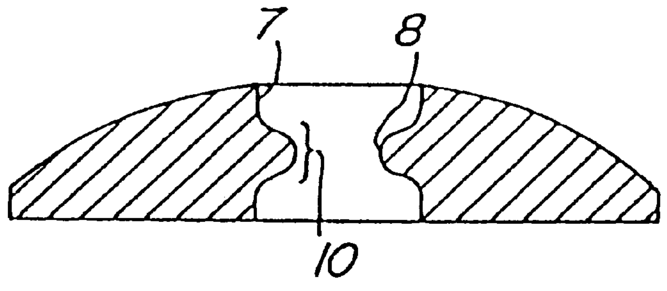
FIG. 3 is a cross sectional view showing another embodiment cut along 1—1 line in FIG. 2*a;*
Figure 4A:
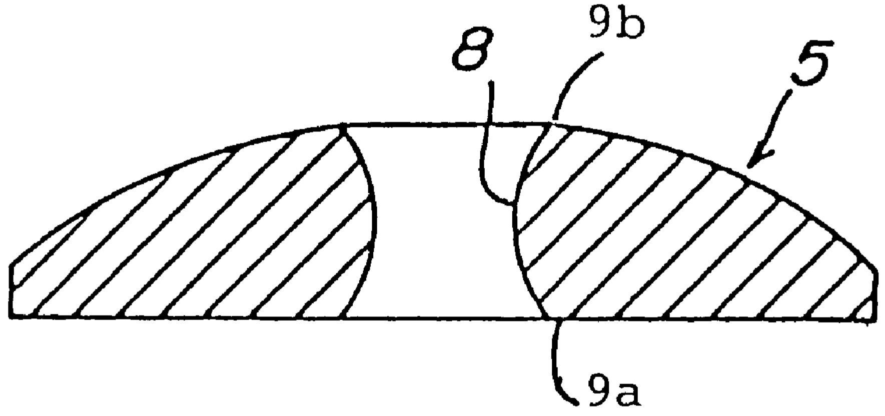
FIGS. 4*a* and 4*b* are cross sectional view respectively illustrating still another embodiment cut along 1—1 line in FIG. 2*a;*
Figure 4B:
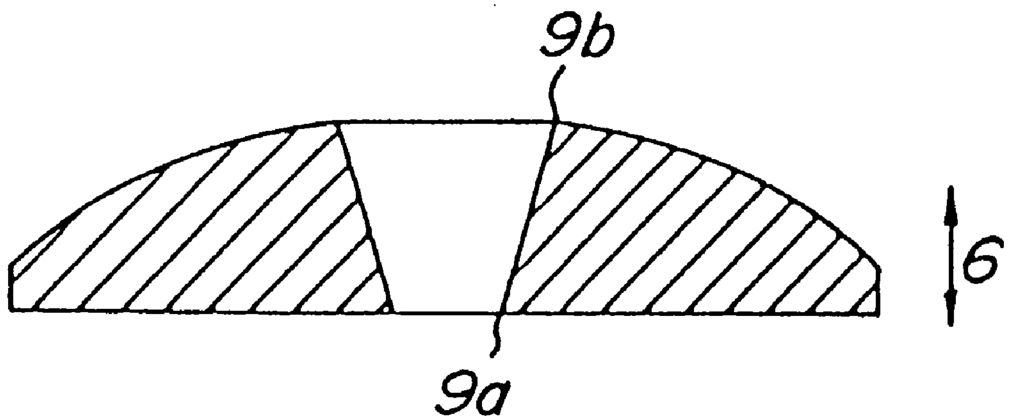

For example, as shown in FIG. 4*a*, it is possible to construct the small diameter portion 8 in such a manner that a diameter is gradually decreased from the edge portions 9*a* and 9*b* to the center portion 10 in an arc shape. Moreover, as shown in FIG. 3, it is possible to construct the small diameter portion 8 in such a manner that a diameter is decreased only at the center portion 10 of the inner circumferential surface 7. Further, as shown in FIG. 4*b*, it is possible to construct the small diameter portion 8 in such a manner that a diameter is gradually decreased from one edge portion 9*b* to the other edge portion 9*a*. Furthermore, it is preferred to arrange the small diameter portion 8 on all around the inner circumferential surface 7, but it is possible to arrange the small diameter portion 8 partly around the inner circumferential surface 7. In the case of using a thickness of the sheath 3 of 5 mm, it is preferred to set a height of the small diameter portion 8 to 1~2 mm.

In both aspects of the invention, it is necessary to construct the shed 5 in such a manner that a securing force of the inner circumferential surface 7 with respect to an outer surface 11 of the sheath 3 is largest at a minimum diameter portion of the small diameter portion 8 as compared with the other portions.

Figure 5A:
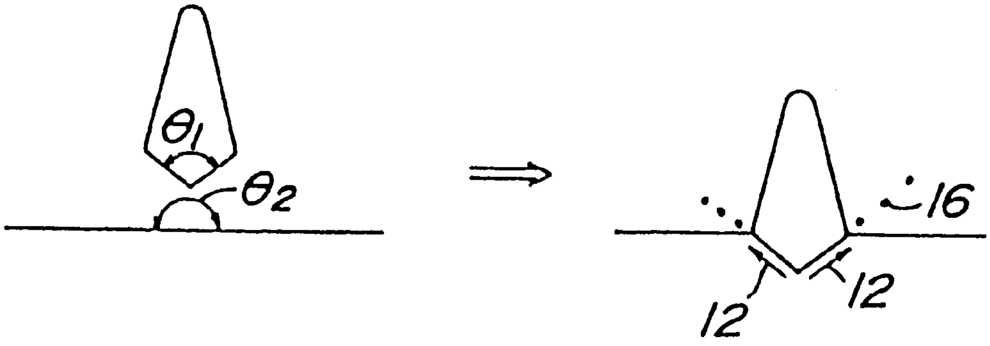
FIGS. 5*a* to 5*c* are schematic views respectively showing a connection state between a shed and a sheath according to the first aspect (FIGS. 5*a* and 5*c*) and the second aspect (FIG. 5*b*) of the invention.
Figure 7:
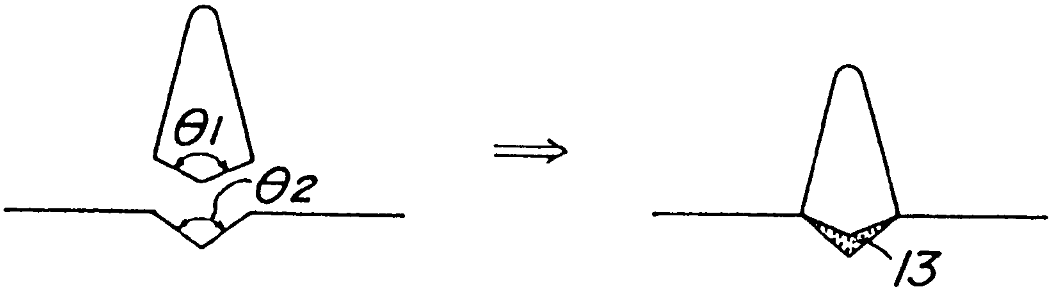
FIG 7 PRIOR ART
FIG. 7 is a schematic view depicting a connection state between a shed and a sheath in which no appropriate small diameter portion is arranged.

Actually, if the small diameter portion 8 has a triangular cross section, it is necessary to set an angle $\theta_1$ defined by the small diameter portion 8 smaller than an angle $\theta_2$ defined by the outer surface 11 of the sheath 3 to which the small diameter portion 8 is connected, as shown in FIGS. 5*a* (first aspect) and 5*b* (second aspect). This is because, if the angle $\theta_1$ is the same as or larger than the angle $\theta_2$ as shown in FIG. 7 (second aspect), adhesives 13 are closed at a boundary between the shed 5 and the sheath 3 and thus a water component or the like included in the adhesives 13 cannot be removed from the boundary. Moreover, it is preferred to set an angle difference ($\theta_2-\theta_1$) between the angle $\theta_1$ and the angle $\theta_2$ to 3~7° for the first aspect of the invention or to 5~10° for the second aspect of the invention. In both cases, if the angle difference is too large, an actual connection area decreases. Moreover, if the angle difference is too small, the securing force of the shed 5 with respect to the sheath 3 decreases and the shed 5 is not connected to the sheath 3.

Figure 5B:
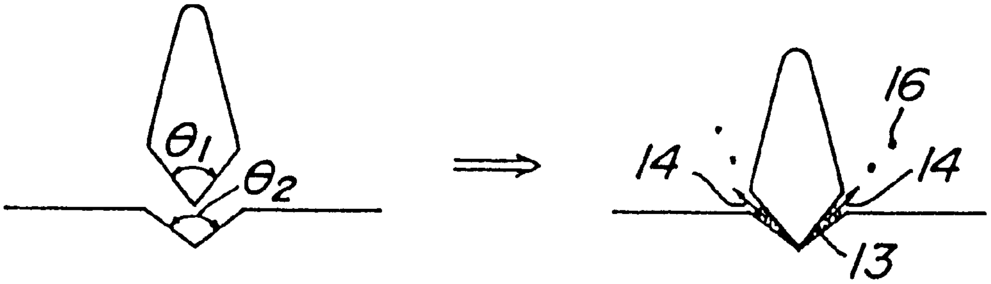
Figure 5C:
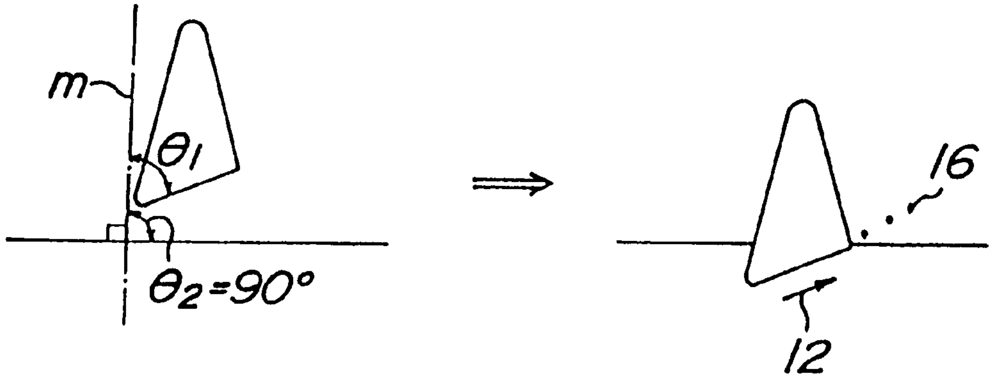
Figure 6:
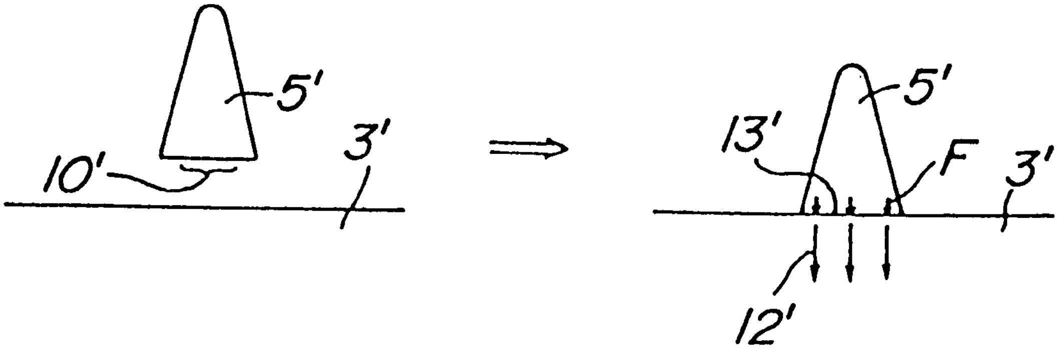
FIG 6 PRIOR ART
FIG. 6 is a schematic view illustrating a connection state between a shed and a sheath according to a know embodiment in which no small diameter portion is arranged.

On the other hand, if the small diameter portion 5 has a cross section shown in FIG. 5*c*, the angle $\theta_1$ mentioned above is substituted by an angle defined between a vertical line m extending on the outer surface of the sheath 3 and the inner circumferential surface of the shed 5, and the angle $\theta_2$ mentioned above is substituted by an angle defined between the vertical line m and the outer surface of the sheath 3. In this case, it is preferred to set an angle difference ($\theta_2-\theta_1$) to 1.5~3.5° for the first aspect of the invention or to 2.5~5.0° for the second aspect of the invention. Moreover, in FIGS. 5*a* and 5*b*, it is preferred to set the angle $\theta_1$ to 120~177° and to set the angle 2 to 123~180°. Further, in FIG. 5*c*, it is preferred to set the angle $\theta_1$ to 60.0~88.5° and to set the angle $\theta_2$ to 61.5~90.0°.

In the embodiments mentioned above, FIGS. 5*a* and 5*c* are schematic views respectively showing the enlarged connection portion between the shed 5 and the sheath 3 when the connection is performed by the curing according to the first aspect of the invention. FIG. 5*b* is a schematic view showing the enlarged connection portion between the shed 5 and the sheath 3 when the connection is performed by using the adhesives 13. Moreover, the sheath 3 to be used for the connection by the curing shown in FIG. 5*a* or 5*c* is the same as the known sheath ($\theta_2$=180°), but it is possible to set the angle $\theta_2$ freely within the angle difference ($\theta_2-\theta_1$) mentioned above.

In the first aspect of the invention, if the shed 5 is set by inserting the sheath 3 therethrough under such a condition that the shapes of the shed 5 and the sheath 3 are adjusted properly, a rubber flow 12 of the non-cured sheath during the curing step occurs from the minimum diameter portion of the small diameter portion to the end portion, as shown in FIGS. 5*a* and 5*c*. Then, a water component 16, a gas component and so on included in the non-cured sheath is moved together with the rubber flow 12. As a result, the water component 16 and so on can be discharged into the air from the connection portion.

In the second aspect of the invention, if the shed 5 is set by inserting the sheath 3 therethrough via the adhesives 13 under such a condition that the shapes of the shed 5 and the sheath 3 are adjusted properly, an adhesive flow 14 occurs from the minimum diameter portion of the small diameter portion to the end portion, as shown in FIG. 5*b*. Then, a water component 16 and so on included in the adhesives 13 is moved together with the adhesive flow 14. As a result, the water component 16 and so on can be discharged into the air from the connection portion.

In the embodiments mentioned above, the explanations are made with respect to polymer insulators, but the same method can be applied to polymer hollow insulators as well. Moreover, various modifications are possible within the scope of the present invention.

Hereinafter, an actual embodiment will be explained. A polymer insulator manufactured according to the first aspect of the invention in which the sheds were connected to the sheath by the curing method and a polymer insulator manufactured according to the second aspect of the invention in which the sheds were connected to the sheath by using the adhesives were prepared. Then, the thus prepared polymer insulators were boiled in a solution having a salt concentration of 0.1 wt % for 42 hours on the basis of IEC standard Pub. No. 1109. After that, dielectric fracture voltages of the polymer insulators were measured to evaluate a performance of the polymer insulators.

As comparison examples, a polymer insulator manufactured according to the known method in which the sheds having a shape without the scope of the invention were connected to the sheath by the curing method and a polymer insulator manufactured according to the known method in which the sheds having a shape without the scope of the invention were connected to the sheath by using the adhesives were also prepared. Then, a performance of the polymer insulators according to the known example were evaluated as is the same as the polymer insulator according to the present invention.

As a result, in both of the polymer insulators according to the known method, a voltage performance with respect to a commercial current frequency was decreased extraordinarily. Contrary to this, in both of the polymer insulators according to the present invention, a voltage performance with respect to a commercial current frequency was not decreased. Moreover, after the performance test, an appearance of the polymer insulators was observed. In the polymer insulators according to the known method, a trace of flashover was detected at the boundary between the shed and the sheath. Contrary to this, in the polymer insulators according to the present invention, no defect was observed.

According to the first aspect and the second aspect of the invention, a water component, a gas component and so on can be removed from the boundary between the shed and the sheath during the connection step, and thus it is possible to prevent a generation of defects such as voids or the like at the boundary. Accordingly, a water component is not intruded into the defects such as voids. Therefore, flashover does not occur under a predetermined flashover voltage, and thus it is possible to obtain trouble-free insulators having excellent high-voltage performance.

What is claimed is:

1. A method of manufacturing insulators with excellent high-voltage performance, comprising the steps of:

arranging a sheath made of non-cured polymer material on an outer surface of a core member;

arranging at least one shed made of cured polymer material on an outer surface of said sheath, each shed comprising an inner circumferential surface extending from one axial end of the shed to the other axial end thereof, said inner circumferential surface defining a bore passing axially through the shed and having an axis that is coincident with that of said core member, wherein substantially the entire axial length of said inner circumferential surface is non-parallel to said axis and converges to a single annular region of minimum diameter; and curing said sheath to connect said sheath to said at least one shed and thereby form a connection portion, wherein during curing flow of the material of the sheath occurs from the minimum diameter region to an end of the shed so that a component included in the material of the sheath is discharged into the air from the connection portion, and wherein a securing force of each shed with respect to said sheath is largest at said annular region of minimum diameter.

2. The method of claim 1, wherein said annular region of minimum diameter is arranged between the axial ends of said shed.

3. The method of claim 1, wherein said annular region of minimum diameter is arranged centrally between the axial ends of said shed.

4. The method of claim 1, wherein said annular region of minimum diameter is arranged at one of the axial ends of said shed.

5. The method of claim 1, wherein said core member has a cylindrical shape.

6. The method of claim 1, wherein said core member is solid.

* * * * *